United States Patent
Nakano (10) Patent No.: US 7,526,914 B2
(45) Date of Patent: May 5, 2009

(54) HEATER CONTROL DEVICE FOR GAS SENSOR

(75) Inventor: Shuichi Nakano, Kariya (JP)

(73) Assignee: DENSO Corporation, Kariya (JP)

( * ) Notice: Subject to any disclaimer, the term of this patent is extended or adjusted under 35 U.S.C. 154(b) by 165 days.

(21) Appl. No.: 11/598,101

(22) Filed: Nov. 13, 2006

(65) Prior Publication Data

US 2007/0113539 A1    May 24, 2007

(30) Foreign Application Priority Data

Nov. 18, 2005   (JP) ............................. 2005-333624

(51) Int. Cl.
*F01N 3/00*   (2006.01)
(52) U.S. Cl. .................... 60/276; 60/274; 60/277; 60/284; 123/672; 123/688; 123/697
(58) Field of Classification Search ................ 60/274, 60/276, 277, 284; 123/385, 672, 676, 688, 123/689, 697
See application file for complete search history.

(56) References Cited

U.S. PATENT DOCUMENTS

| | | | | |
|---|---|---|---|---|
| 5,353,774 A | * | 10/1994 | Furuya | 123/685 |
| 5,497,655 A | * | 3/1996 | Gee et al. | 73/114.73 |
| 6,164,125 A | * | 12/2000 | Kawase et al. | 73/114.73 |
| 6,304,813 B1 | * | 10/2001 | Ikeda et al. | 701/109 |
| 6,781,098 B2 | * | 8/2004 | Toyoda | 219/501 |
| 6,812,436 B2 | * | 11/2004 | Nomura et al. | 219/497 |
| 6,898,927 B2 | * | 5/2005 | Morinaga et al. | 60/284 |
| 6,935,101 B2 | * | 8/2005 | Morinaga et al. | 60/284 |

FOREIGN PATENT DOCUMENTS

| | | |
|---|---|---|
| JP | 09-184443 | 7/1997 |
| JP | 2003-083152 | 3/2003 |

* cited by examiner

*Primary Examiner*—Binh Q Tran
(74) *Attorney, Agent, or Firm*—Nixon & Vanderhye P.C.

(57) ABSTRACT

An oxygen concentration sensor including the sensor element for detecting oxygen concentration in the exhaust gas and the heater for heating the sensor element is installed at the location downstream of a DPF. An ECU controls power supply to the heater to make the sensor element at a predetermined active state. The ECU calculates heat data corresponding to a heat budget in the exhaust pipe in close proximity to the sensor location part after the engine startup, based upon an operating condition of the engine and a driving condition of a vehicle and also makes a determination as to dryness inside the exhaust pipe based upon the heat data. In addition, the power supply to the heater is controlled based upon the result of the dryness determination.

8 Claims, 5 Drawing Sheets

HEATER CONTROL DEVICE FOR GAS SENSOR

CROSS-REFERENCE TO RELATED APPLICATION

This application is based on Japanese Patent Application No. 2005-333624 filed on Nov. 18, 2005, the disclosure of which is incorporated herein by reference.

FIELD OF THE INVENTION

The present invention relates to a heater control device for a gas sensor.

BACKGROUND OF THE INVENTION

Recently regulations on exhaust gas in a vehicle for the purpose of protection on the global environment have been increasingly tightened annually. There has been proposed the associated technique which acquires information on oxygen concentration in the exhaust gas or the like and uses the acquired information for various controls. For example, there are studies on techniques of correcting variations in fuel injection quantity and EGR quantity, and detecting a deterioration state of an exhaust gas purifying device such as a catalyst, based upon information on oxygen concentration in the exhaust gas.

A known gas sensor for acquiring information on oxygen concentration in the exhaust gas is provided with a sensor element formed of solid electrolyte such as zirconia. The sensor element is maintained at a predetermined active temperature, thereby outputting a density detection signal in accordance with the then-oxygen concentration. In this case, the sensor element houses a heater therein. When the heater is energized to generate heat, a temperature of the sensor element rises and the sensor element is maintained at an active state.

A gas sensor is generally installed in an exhaust pipe connected to an engine body. Therefore, when at cold startup of an engine, water vapor in the exhaust gas is condensed to form condensed water, the condensed water threatens to be attached to the sensor element which is being heated by the heater. When the condensed water is attached to the sensor element during heating, excessive heat stress acts on the sensor element, bringing about the likelihood that the sensor element is damaged. When the sensor element is damaged, the sensor output deteriorates in accuracy, resulting in the possibility that adverse affect be applied to a control system for an engine or the like.

Therefore, there is proposed a technique for controlling power supply to the heater after the engine startup for protection of the sensor element or the like. For example, JP-A-9-184443 discloses the technique that in an exhaust system with a catalyst, an accumulated heat quantity introduced to the catalyst after the engine startup is calculated and also the power supply to the heater is designed to be prohibited until the accumulated heat quantity reaches a predetermined value. In addition, JP-A-2003-83152 discloses the technique that it is determined whether or not water components are attached to an inner wall of an exhaust pipe. When the water components are attached to the wall, the power supply to the heater is controlled in such a way as to maintain the heater at a temperature lower than usual. A determination on attachment of the water components to the inner wall of the exhaust pipe is made based upon an exhaust pipe temperature calculated by an exhaust gas temperature and an outside air temperature.

However, in the case of JP-A-9-184443, even if the power supply to the heater is allowed based upon the introduced heat quantity to the catalyst after the engine startup, there is the possibility that the condensed water is in fact present at a sensor location part of the exhaust pipe at the allowance timing. In addition, in contrast, there is the possibility that the condensed water at the sensor location part of the exhaust pipe already dries out before allowance of the power supply to the heater (a state of power supply prohibition). This case raises the problem that the power supply to the heater cannot start at proper timing and therefore, desired protection or earlier activation of the sensor element cannot be realized.

Further, in the case of JP-A-2003-83152, the attachment of the water components to the inner wall of the exhaust pipe is estimated based upon the temperature of the exhaust pipe calculated from the exhaust gas temperature and the outside air temperature. However, in the event of application of a gas sensor to an actual vehicle, even if the temperature of the exhaust pipe is estimated by using the exhaust gas temperature and the outside air temperature as parameters as described above, the estimation accuracy results in a low state. This is because a correlation between an exhaust gas temperature and an exhaust pipe temperature varies with an engine operating condition or a vehicle driving condition. Therefore, JP-A-2003-83152 has the possibility that the power supply to the heater cannot be managed appropriately.

SUMMARY OF THE INVENTION

The present invention has been made in view of the foregoing problems and an object of the present invention is to provide a heater control device for a gas sensor which appropriately performs power supply to a heater after engine startup, thereby leading to achieving a desired effect such as protection or earlier activation of a sensor element.

According to the present invention, a heater control device for a gas sensor comprising: heat calculator which calculates heat data corresponding to a heat budget in the exhaust pipe in a vicinity of the gas sensor after engine startup based upon an operating condition of an engine and a driving condition of a vehicle; a determiner which makes a determination as to dryness inside the exhaust pipe based upon the calculated heat data; and a limiter which limits the power supply to the heater based upon the result of the determination as to the dryness by the determination means.

BRIEF DESCRIPTION OF THE DRAWINGS

Other objects, features, and advantages of the present invention will become more apparent from the following detailed description made with reference to the accompanying drawings, in which like portions are designated by like reference numbers and in which.

DETAILED DESCRIPTION OF EXAMPLE EMBODIMENT

First Embodiment

A first embodiment of the present invention will be hereinafter explained with reference to accompanying drawings. In the embodiment, an engine control system is structured as to be applied to a multi-cylinder diesel engine as a control object. In this control system, various controls for the engine are performed mainly by an electronic control unit (hereinafter referred to as "ECU"). First, an outline of the engine control system will be explained with reference to FIG. 1.

Figure 1:
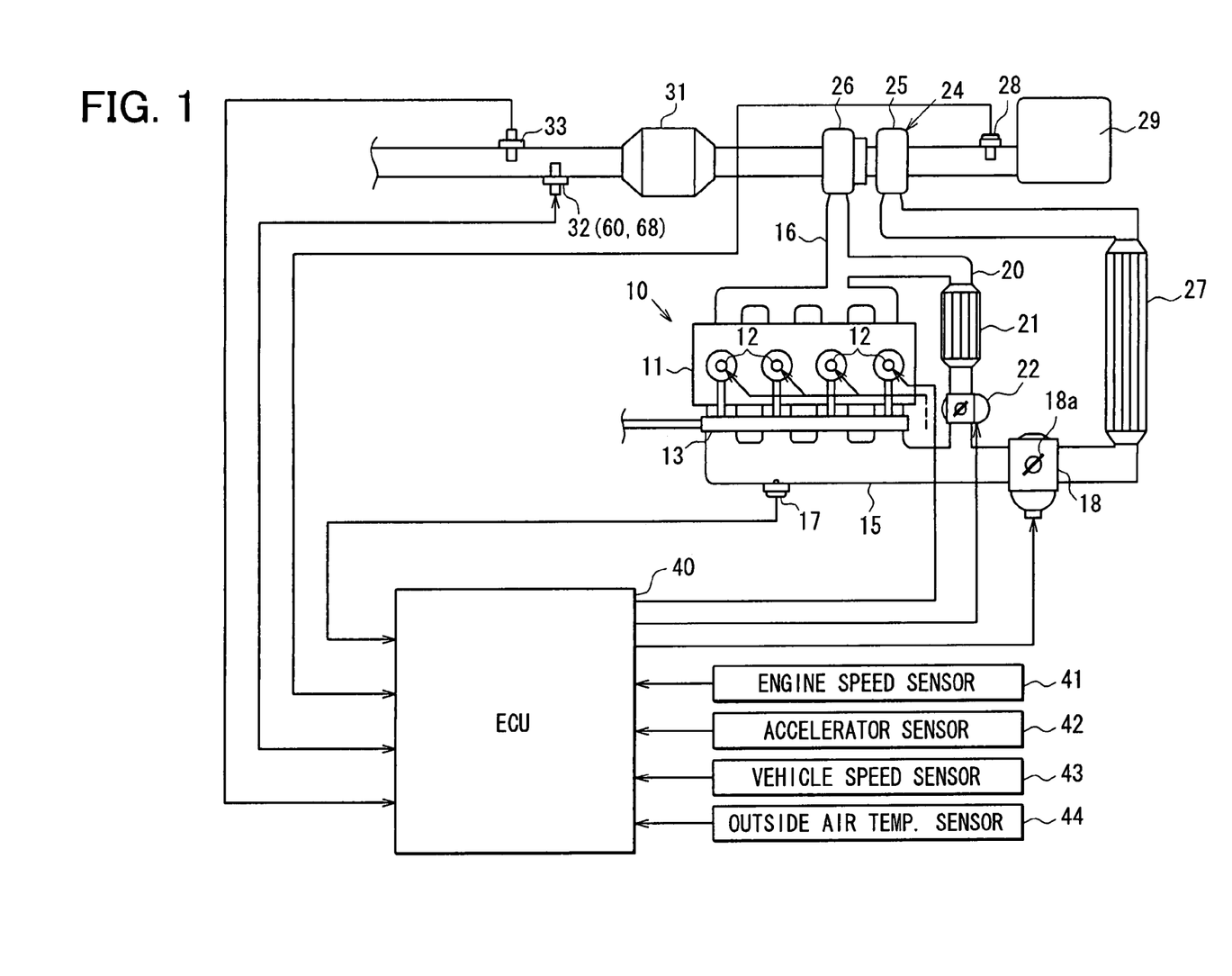
FIG. 1 is a schematic structural diagram showing an engine system in a first embodiment of the present invention.

Referring to FIG. 1, in an engine 10, an injector 12 is disposed in an engine body 11 for each cylinder. High-pressure fuel is supplied to the injector 12 from a common rail 13, and operating the injector 12 for opening causes fuel to be injected/supplied directly from an injector nozzle part to each cylinder. The high-pressure fuel is supplied from a high-pressure pump to the common rail 13 (not shown) and accordingly, a predetermined high-pressure state is maintained in the common rail 13.

An intake pipe (including a manifold part) 15 and an exhaust pipe (including a manifold part) 16 are connected to the engine body 11. An intake pressure sensor 17 is installed in the intake pipe 15. In addition, a throttle actuator 18 having a throttle valve 18a is installed in the intake pipe 15. The intake pipe 15 and the exhaust pipe 16 are connected by an EGR passage 20. An EGR cooler 21 and an EGR valve 22 are disposed in the EGR passage 20.

In addition, this system is provided with a turbocharger 24 as supercharging means. The turbocharger 24 has a compressor impeller 25 disposed in the intake pipe 15 and a turbine wheel 26 disposed in the exhaust pipe 16. The turbine wheel 26 is rotated by an exhaust gas flowing in the exhaust pipe 16 and the rotational force thereof is transmitted through a shaft (not shown) to the compressor impeller 25. An intake air flowing in the intake pipe 15 is compressed by the compressor impeller 25 for supercharging. The air supercharged in the turbocharger 24 is cooled by an intercooler 27 and thereafter, supplied to the downstream side of the intake pipe 15.

An air flow meter 28 for detecting an intake air quantity is disposed at the upstream side of the compressor impeller 25 in the intake pipe 15. An air cleaner 29 is disposed in a top part of the intake pipe 15.

In addition, a diesel particulate filter (hereinafter referred to as "DPF") 31 is installed in the exhaust pipe 16 at a location downstream of the turbine wheel 26 and the DPF 31 traps particulate matter (hereinafter referred to as "PM") in the exhaust gas. An oxygen concentration sensor 32 for detecting oxygen concentration in the exhaust gas and an exhaust gas temperature sensor 33 for detecting an exhaust gas temperature are disposed at the downstream side of the DPF 31. Since at this point, the oxygen concentration sensor 32 and the exhaust gas temperature sensor 33 are arranged relatively close to each other, an exhaust gas in close proximity to the oxygen concentration sensor 32 is detected by the exhaust gas temperature sensor 33. A NOx occlusion reduction catalyst, an oxidation catalyst or the like is known in addition of the DPF 31 as an exhaust gas purifying device and therefore, it may be used an exhaust gas purifying system equipped with a NOx occlusion reduction catalyst or an oxidation catalyst.

An ECU 40 is structured mainly of a microcomputer composed of a CPU, a ROM, a RAM and the like. Detection signals of sensors such as the intake pressure sensor 17, the air flow meter 28, the oxygen concentration sensor 32, and the exhaust gas temperature sensor 33, and besides, detection signals of various sensors such as a rotational speed sensor 41 for detecting a rotational speed of an engine, an accelerator sensor 42 for detecting an accelerator operational quantity by a driver, a vehicle speed sensor 43 for detecting a vehicle speed and an outside air temperature sensor 44 for detecting an outside air temperature are inputted to the ECU 40 one after another. The ECU 40 determines an optimal fuel injection quantity and optimal injection timing based upon engine operating information such as an engine rotational speed and an accelerator operational quantity and outputs the corresponding injection control signal to the injector 12. Thus fuel injection by the injector 12 for each cylinder is controlled. Besides, the ECU 40 controls the throttle actuator 18, the EGR valve 22 and the like based upon the then-engine operating condition as needed.

Figure 2A:
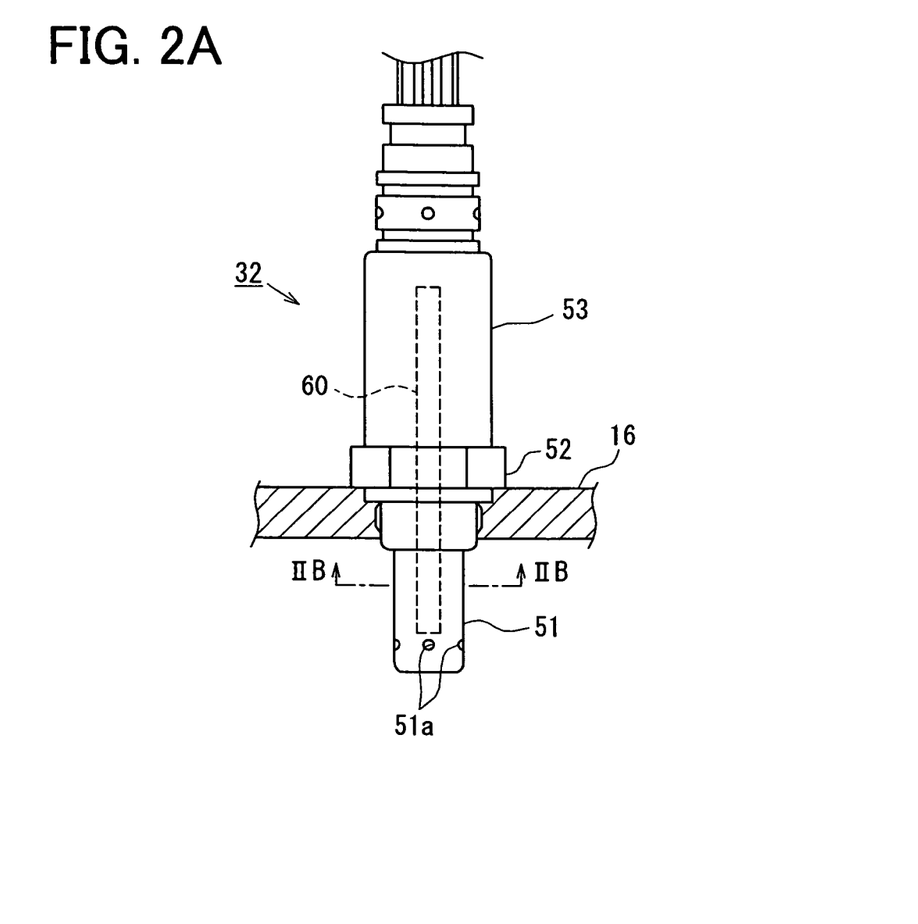
FIG. 2A is an outside view showing a state where an oxygen concentration sensor is installed in an exhaust pipe.
Figure 2B:
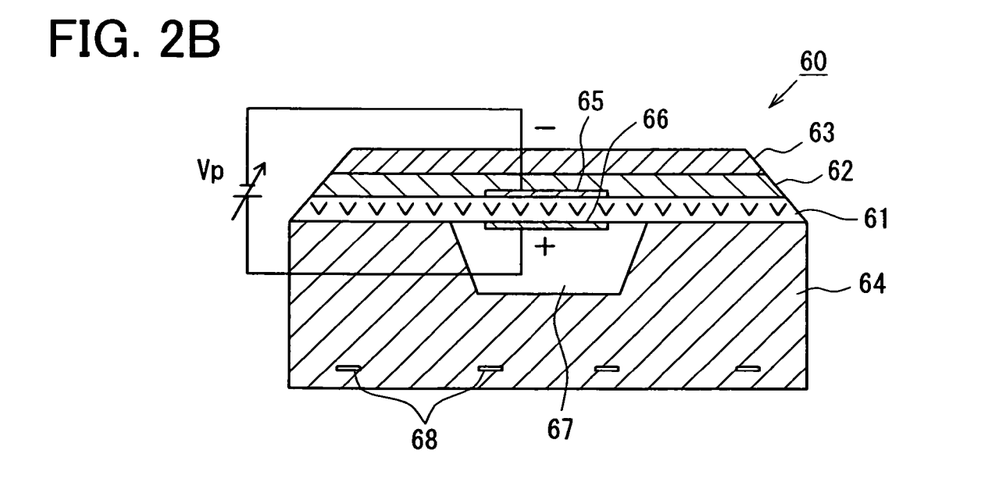
FIG. 2B is a cross section showing an inside structure of a sensor element constituting the oxygen concentration sensor.

Here, a detail of the oxygen concentration sensor 32 disposed in the exhaust pipe 16 will be explained with reference to FIGS. 2A and 2B. FIG. 2A is an outside view showing a state where the oxygen concentration sensor 32 is located in the exhaust pipe 16. FIG. 2B is a cross section showing an inside structure of the sensor element 60 constituting the oxygen concentration sensor 32, taken on line IIB-IIB of FIG. 2A.

As shown in FIG. 2A, the oxygen concentration sensor 32 includes a front-side cover 51, a housing 52 and a base-side cover 53 and is in a generally columnar shape as a whole. An elongated sensor element 60 is received inside the oxygen concentration sensor 32. The oxygen concentration sensor 32 is attached to a wall part of the exhaust pipe 16 through the housing 52. At the attached state, the front-side cover 51 is located inside the exhaust pipe 16 where an exhaust gas is supplied through a plurality of small holes 51a formed in the front-side cover 51 to the circumference of the sensor element 60. The sensor element 60 is of a so-called laminated structure.

As shown in FIG. 2B, the sensor element 60 includes a solid electrolyte 61, a diffusion resistance layer 62, a blocking layer 63 and an insulating layer 64, which are laminated in upward and downward directions in the figure to form it. A protection layer (not shown) is disposed in the circumference of the sensor element 60. The solid electrolyte 61 of a rectangular plate type (solid electrolyte element) is a sheet of partially stabilized zirconia. A pair of electrodes 65 and 66 are arranged opposed to each other by placing the solid electrolyte 61 therebetween. The electrode 65 and 66 is formed of noble metal such as platinum. The diffusion resistance layer 62 is formed of a porous sheet for introducing the exhaust gas to the electrode 65 and the blocking layer 63 is formed of a dense layer for restricting transmission of the exhaust gas. Each of the layers 62 and 63 is formed by molding ceramics such as alumina or zirconia by a sheet molding method, but differs in a gas transmission rate due to differences in an average bore diameter of porosity and a gas cavity rate.

The insulating layer 64 is formed of ceramics such as alumina or zirconia and an air duct 67 is formed at a portion of the insulating layer 64, facing the electrode 66. Heaters 68 formed of platinum or the like are buried in the insulating layer 64. The heater 68 is composed of a linear heating element which generates heat due to power supply thereto from a battery source. The generated heat heats the entire sensor element. The heater 68 is not buried in the insulating layer 64 (not housed in the sensor element 60), but as an alternative, may be attached to the outside face of the sensor element 60.

In the oxygen concentration sensor 32 as described above, a predetermined voltage is applied between the electrodes 65 and 66 of the sensor element 60 to produce the current in accordance with the oxygen concentration in the exhaust gas, in the solid electrolyte 61 and the current (element current) is measured. The oxygen concentration (A/F) is calculated based upon the measured value of the element current.

In order to accurately detect an oxygen concentration (A/F) with the oxygen concentration sensor 32, it is required to maintain the sensor element in a predetermined active state (element temperature=650° C. or more). Therefore, control of the power supply to the heater 68 is performed by the ECU 40. More specially, a power supply quantity to the heater 68 is determined based upon the then-element temperature of the sensor element 60 and the heater power supply state is controlled by the power supply quantity to the heater 68. For example, the power supply to the heater 68 is controlled by a duty control signal. At the time of usual sensor operating, a feedback control of an element temperature is performed and an element impedance having a correlation with the element temperature is calculated at a predetermined cycle. In addition, the power supply quantity to the heater (duty ratio) is feedback-controlled so that the element impedance is equal to a target value.

At the cold startup of the engine 10, water vapors in the exhaust gas are condensed on the wall surface of the exhaust pipe 16 due to a low temperature of the wall surface. In this case, when the condensed water is attached to the sensor element 60 in the middle of heating by the heater 68, an excessive heat stress occurs in the zirconia solid electrolyte, thereby possibly damaging the sensor element 60. The damaged sensor element 60 possibly not only deteriorates accuracy in an output of the oxygen concentration sensor 32 but also does not acquire a normal output thereof, resulting in an erroneous operation of the system.

Therefore, according to the embodiment, after engine startup, heat data corresponding to a heat budget in close proximity to the location part of the oxygen concentration sensor 32 in the exhaust pipe 16 is calculated based upon an operating condition of the engine 10 and a driving condition of a vehicle and also a determination is made as to dryness in the exhaust pipe 16 in close proximity to the location part of the oxygen concentration sensor 32 from the calculated heat data. In addition, the power supply to the heater 68 is allowed or prohibited based upon the result of the determination as to the dryness.

Figure 3:
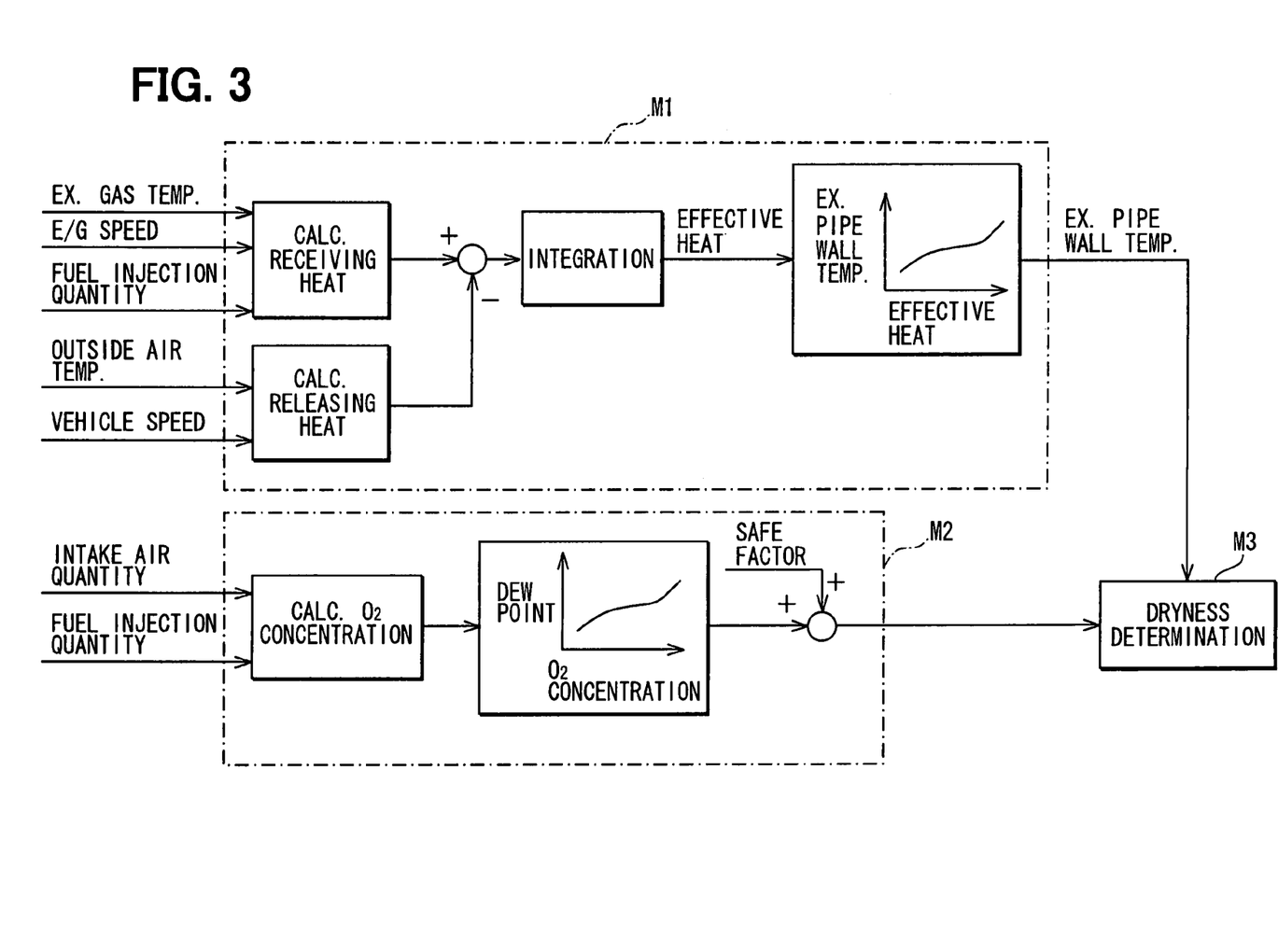
FIG. 3 is a control block diagram for making a determination as to dryness in an exhaust pipe.

FIG. 3 is a control block diagram with respect to a determination as to dryness in the exhaust pipe 16 in close proximity to the location part of the oxygen concentration sensor 32. FIG. 3, as roughly classified, includes a calculation section M1 of an exhaust pipe wall temperature for calculating an exhaust pipe wall temperature, a calculation section M2 of a dew point temperature for detecting a dew point temperature based upon an atmosphere inside the exhaust pipe 16, and a dryness determination section M3 for making a determination as to dryness inside the exhaust pipe 16 from the exhaust pipe wall temperature and the dew point temperature. The detail will be hereinafter explained.

In the calculation section M1 of the exhaust pipe wall temperature, an exhaust-pipe-receiving heat per unit time is calculated by using an exhaust gas temperature in close proximity to the oxygen concentration sensor 32, an engine rotational speed and a fuel injection quantity as parameters, and also an exhaust-pipe-releasing heat is calculated by using an outside air temperature and a vehicle speed as parameters. The engine rotational speed and the fuel injection quantity are parameters for estimating an exhaust gas speed in close proximity to the oxygen concentration sensor 32. An exhaust-pipe-receiving heat in close proximity to the oxygen concentration sensor 32 is calculated from an exhaust gas temperature and an exhaust gas speed in close proximity to the oxygen concentration sensor 32.

In addition, in the calculation section M1 of the exhaust pipe wall temperature, a differential quantity between the exhaust-pipe-receiving heat and the exhaust-pipe-releasing heat (=the exhaust-pipe-receiving heat−the exhaust-pipe-releasing heat) is sequentially calculated, thereby calculating an effective heat of the exhaust pipe 16 after the engine startup. In addition, an exhaust pipe wall temperature is calculated based upon the effective heat. At this point, the effective heat has a correlation with the exhaust pipe wall temperature and therefore, as the effective heat increases, the exhaust pipe wall temperature is calculated as a higher temperature. The effective heat corresponds to heat data in accordance with a heat budget in close proximity to the sensor location part.

In addition, in the calculation section M2 of the dew point temperature, an exhaust oxygen concentration is calculated by using an intake air quantity and a fuel injection quantity as parameters and also a dew point temperature in close proximity to the oxygen concentration sensor 32 is calculated based upon the exhaust oxygen concentration. At this point, the exhaust oxygen concentration has a predetermined relation with the dew point temperature and as the exhaust oxygen concentration increases, the dew point temperature is calculated as a higher temperature. That is, in a case where the exhaust oxygen concentration is high (i.e., in a case where an air-fuel ratio is lean), a water vapor quantity existing in the exhaust pipe is very small and therefore, the dew point temperature is calculated as high. A slight correction by safety coefficient is, however, made to a calculation value of the dew point temperature.

In the dryness determination section M3, the exhaust pipe wall temperature and the dew point temperature are compared to make a determination as to dryness inside the exhaust pipe 16. In the exhaust pipe 16, condensation or dryness of the water vapors in the exhaust gas occurs by dew formation phenomenon, depending on a dew point temperature as a boundary. In a case where the exhaust pipe wall temperature<the dew point temperature, it is determined that the condensed water exists inside the exhaust pipe 16. In a case where the exhaust pipe wall temperature $\geqq$ the dew point temperature, it is determined that the inside of the exhaust pipe 16 has dried out.

Figure 4:
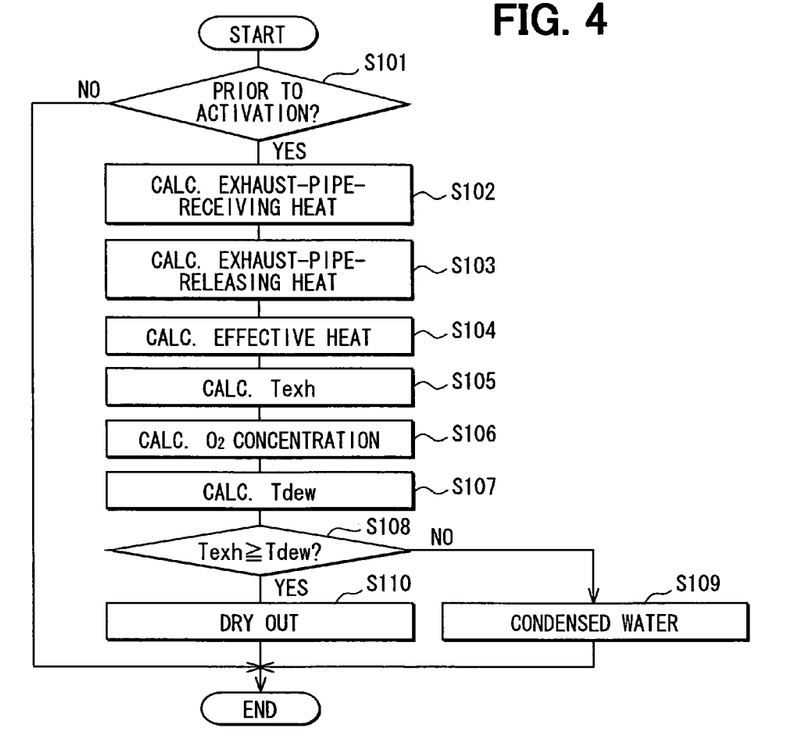
FIG. 4 is a flow chart showing a process order of a routine for making a determination as to dryness in an exhaust pipe.

FIG. 4 is a flow chart showing a process order of a routine for making a determination as to dryness inside the exhaust pipe 16, and the routine is repeatedly executed at a predetermined cycle by the ECU 40.

Referring to FIG. 4, at step S101, it is determined whether or not the oxygen concentration sensor 32 is in a state prior to activation after engine startup. When the oxygen concentration sensor 32 is in a state prior to activation, the process goes to step S102. When the oxygen concentration sensor 32 is in a state after activation, the subsequent processes are not necessary and this routine ends.

At step S102, an exhaust-pipe-receiving heat per unit time is calculated by using an exhaust gas temperature in close proximity to the oxygen concentration sensor 32, an engine rotational speed and a fuel injection quantity as parameters, and at next step S103, an exhaust-pipe-releasing heat is calculated by using an outside air temperature and a vehicle speed as parameters. At step S104, a differential quantity between the exhaust-pipe-receiving heat and the exhaust-pipe-releasing heat is sequentially integrated, thereby calculating an effective heat of the exhaust pipe 16 after the engine startup. Thereafter, at step S105, an exhaust pipe wall temperature Texh is calculated based upon the effective heat.

In addition, at step S106, an exhaust oxygen concentration is calculated by using an intake air quantity and a fuel injection quantity as parameters, and at next step S107, a dew point temperature Tdew in close proximity to the oxygen concentration sensor 32 is calculated based upon the exhaust oxygen concentration.

Therefore, at step S108, it is determined whether or not the exhaust pipe wall temperature Texh≧the dew point temperature Tdew. When Texh<Tdew, the process goes to step S109 in which it is determined that the condensed water exists inside the exhaust pipe 16. When Texh≧Tdew, the process goes to step S110 in which it is determined that the inside of the exhaust pipe 16 has dried out.

Figure 5:
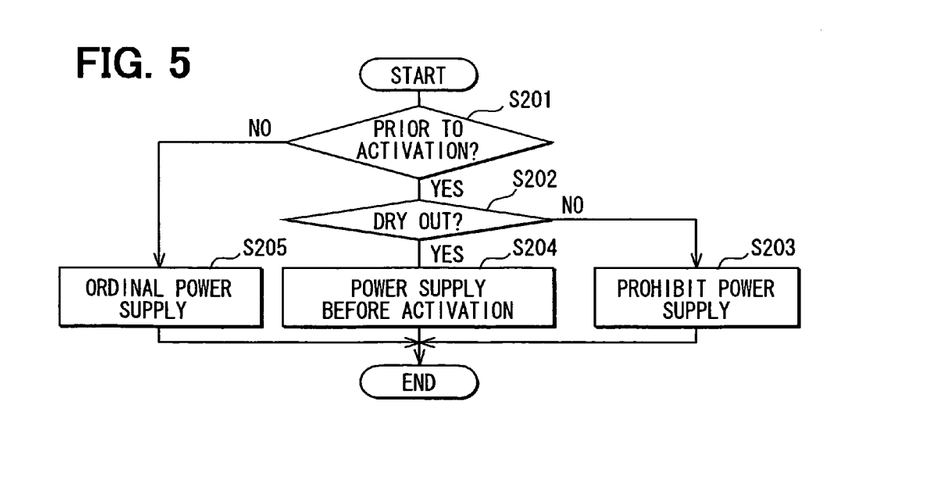
FIG. 5 is a flow chart showing a process order of a routine of power supply to a heater.

FIG. 5 is a flow chart showing a process order of a routine for power supply to a heater and this routine is repeatedly executed at a predetermined cycle by the ECU 40.

Referring to FIG. 5, at step S201, it is determined whether or not the oxygen concentration sensor 32 is in a state prior to activation after engine startup. When the oxygen concentration sensor 32 is in a state prior to activation, the process goes to subsequent step S202. At step S202, it is determined whether or not the inside of the exhaust pipe 16 dries out by referring to the dryness determination result in FIG. 4. When the inside of the exhaust pipe 16 does not dry out, the process goes to step S203 in which the power supply to the heater 68 is prohibited. On the other hand, when the inside of the exhaust pipe 16 has dried out, the power supply to the heater 68 is allowed and the process goes to step S204 in which control of power supply to the heater before activation of the heater 68 is performed. The power supply to the heater 68 is performed by the control of the power supply to the heater 68 before the activation of the heater 68, such as a predetermined and fixed duty ratio.

When the oxygen concentration sensor 32 is in a state after the activation, the process goes to step S205 in which usual control of the power supply to the heater 68 is performed. At this point, with respect to the usual control of the power supply to the heater 68, a control duty for the power supply to the heater 68 is calculated based upon a deviation between a detection value of the element impedance of the oxygen concentration sensor 32 and a target impedance. The power supply to the heater 68 is performed by the calculated control duty.

According to the embodiment as described in detail, since a determination as to dryness inside the exhaust pipe 16 is made and the power supply to the heater 68 is allowed or prohibited based upon the result, the problem that the sensor element of the oxygen concentration sensor 32 is damaged due to the condensed water inside the exhaust pipe 16 is solved. In this case, the heat data as a determination parameter for dryness determination (effective heat for calculating an exhaust pipe wall temperature in this embodiment) is calculated based upon an operating condition of the engine 10 and a vehicle driving condition. Therefore, a determination as to dryness inside the exhaust pipe 16 can be made sufficiently considering the surrounding environment of the engine 10 after the engine startup. Accordingly, a dry state in the exhaust pipe 16 at the location part of the oxygen concentration sensor can be appropriately determined, thereby switching prohibition and allowance of the power supply to the heater 68 after the engine startup at proper timing. As a result, desired effects such as protection or earlier activation of the sensor element 60 can be achieved.

Since protection or earlier activation of the sensor element 60 can be achieved, oxygen concentration detection can be performed with a high accuracy and reliability. As a result, an improvement on exhaust emissions can be achieved.

In addition, an effective heat of the exhaust pipe 16 after the engine startup is calculated by a differential quantity between an exhaust-pipe-receiving heat calculated based upon an exhaust gas temperature and an exhaust gas speed in close proximity to the oxygen concentration sensor 32 and an exhaust-pipe-releasing heat calculated based upon an outside air temperature and a running speed of a vehicle. Therefore, the effective heat can be calculated by reflecting a warming-up condition of the engine 10 and a cooling function of the surrounding environment. Accordingly, the effective heat corresponding to the heat budget after the engine startup can be calculated, resulting in an improvement on control properties of power supply to the heater 68.

For example, since at the engine re-startup in an engine warming-up condition, an exhaust gas temperature in close proximity to the oxygen concentration sensor 32 is higher that at the engine cooling startup, the exhaust-pipe-receiving heat calculated by using the exhaust gas temperature as a parameter becomes a large value. Accordingly, at the engine re-startup, a determination as to dryness inside the exhaust pipe 16 at the engine re-startup is earlier made by reflecting a high temperature of the exhaust gas, thereby making it possible to avoid the inconvenience that start of the power supply to the heater 68 at the engine re-startup is delayed.

Further, since the exhaust pipe wall temperature Texh calculated based upon the effective heat of the exhaust pipe 16 and the dew point temperature Tdew inside the exhaust pipe 16 are compared to determine a dryness condition inside the exhaust pipe 16, a determination as to dryness can be properly made based upon dew formation phenomenon inside the exhaust pipe 16. At this point, since the dew point temperature is calculated by the exhaust pipe density estimated based upon an engine operating condition, the exhaust oxygen concentration can be obtained according to the then-state inside the exhaust pipe 16, thereby improving accuracy in dryness determination.

As described above, the effective heat of the exhaust pipe 16 is calculated based upon an operating condition of the engine 10 and a driving condition of a vehicle. Therefore, a relation between the effective heat and the exhaust pipe wall temperature is maintained at a constant one regardless of an engine operating condition and a vehicle running condition. Accordingly, the exhaust pipe wall temperature can be accurately obtained, resulting in an improvement on control properties of power supply to the heater 68.

In addition, the present invention is not limited to the description of the above embodiment, but may be carried out as follows.

Second Embodiment

Figure 6:
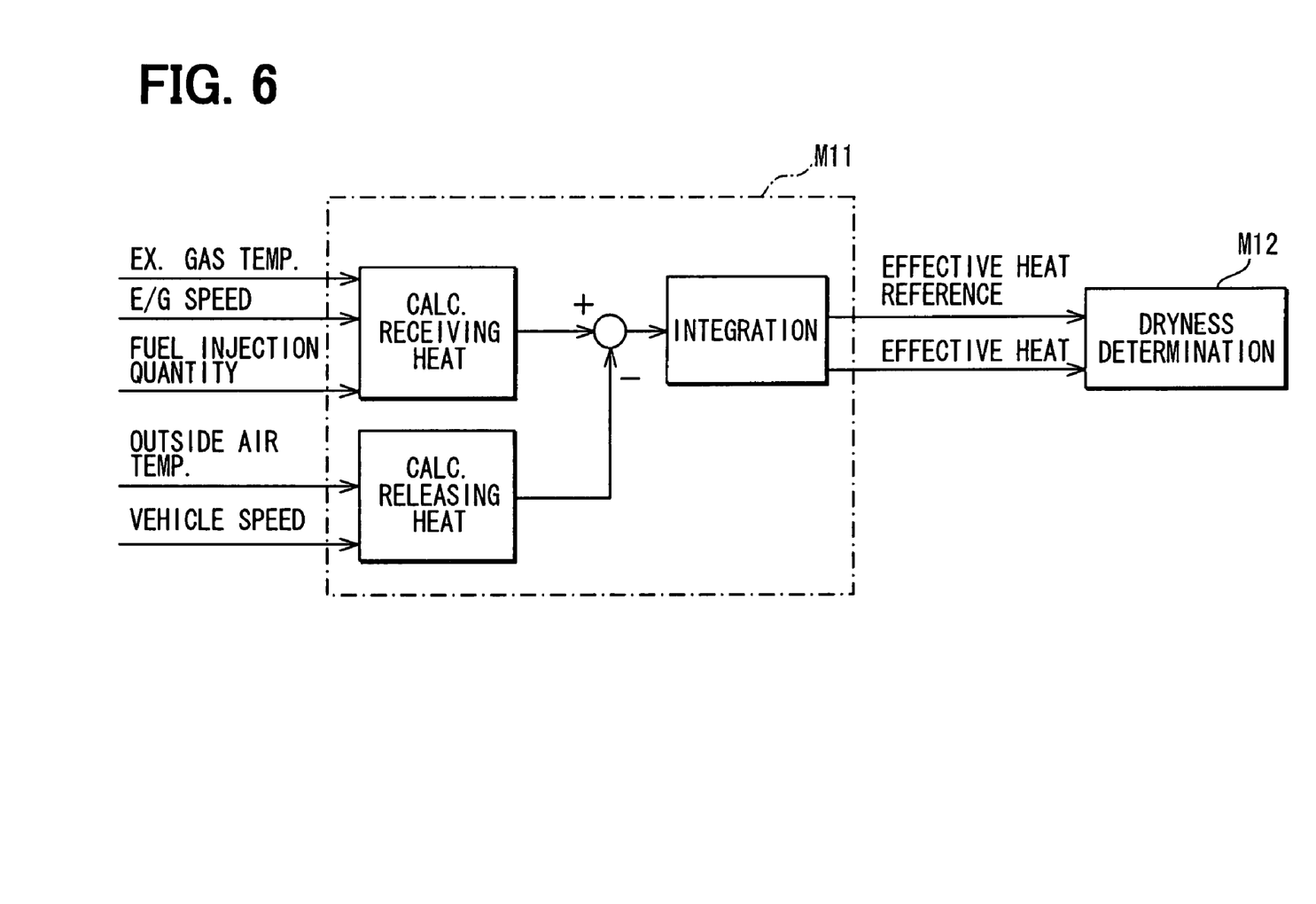
FIG. 6 is a control block diagram for making a determination as to dryness in an exhaust pipe in a second embodiment.

FIG. 6 is a control block diagram showing a dryness determination logic of the exhaust pipe 16 in a second embodiment. The dryness determination logic, as roughly classified, includes a calculation section M1 of effective heat for calculating an effective heat of the exhaust pipe 16 and a dryness determination section M12 for making a determination as to dryness inside the exhaust pipe 16 based upon the effective heat. The detail thereof will be hereinafter explained.

In the calculation section M11 of the effective heat, the same as the calculation section M1 of the exhaust pipe wall temperature (refer to FIG. 3), an exhaust-pipe-receiving heat per unit time is calculated by using an exhaust gas temperature in close proximity to the oxygen concentration sensor 32, an engine rotational speed and a fuel injection quantity as parameters, and also an exhaust-pipe-releasing heat is calculated by using an outside air temperature and a vehicle speed as parameters. In addition, a differential quantity between the exhaust-pipe-receiving heat and the exhaust-pipe-releasing heat (=the exhaust-pipe-receiving heat−the exhaust-pipe-releasing heat) is sequentially integrated, thereby calculating an effective heat of the exhaust pipe 16 after the engine startup.

In the dryness determination section M12, the effective heat calculated in the calculation section M11 and a predetermined value of the effective heat separately set are compared to make a determination as to dryness inside the exhaust pipe 16. At this point, when the effective heat<the predetermined value of the effective heat, it is determined that the condensed water exists inside the exhaust pipe 16. When the effective heat≧the predetermined value of the effective heat, it is determined that the inside of the exhaust pipe 16 has dried out.

The structure in the second embodiment of FIG. 6 also, the same as the first embodiment, solves the problem that a sensor element of the oxygen concentration sensor 32 is damaged due to the condensed water inside the exhaust pipe 16. As a result, desired effects such as protection or earlier activation of the sensor element 60 can be achieved.

Other Embodiment

In the first embodiment, the power supply to the heater 68 is allowed or prohibited based upon the result of the determination as to dryness inside the exhaust pipe 16, but as an alternative, the limit of the power supply to the heater 68 may be controlled based upon the result of the dryness determination. More specially, in a case where the oxygen concentration sensor 32 is in a state prior to activation and also the inside of the exhaust pipe 16 does not dry out yet (i.e., in FIG. 5, in a case step S201=YES and step S202=NO), the power supply to the heater 68 is performed with a duty ratio smaller than a duty ratio before the sensor is activated and after the exhaust pipe 16 dries out.

In addition, for calculating the exhaust-pipe-receiving heat, a temperature of engine cooling water (engine water temperature) may be added as a calculation parameter.

In the first embodiment, an exhaust gas temperature in close proximity to the oxygen concentration sensor 32 is measured by the exhaust gas temperature sensor 33 located in close proximity to the oxygen concentration sensor 32, but this structure may be modified. That is, an exhaust gas temperature sensor disposed at a location away from the oxygen concentration sensor 32 (for example, upstream of the DPF 31) is used to correct the measured temperature by the exhaust gas temperature sensor in consideration of a temperature quantity reduced by the time the exhaust gas flows to the oxygen concentration sensor 32, thus obtaining an exhaust gas temperature in close proximity to the oxygen concentration sensor 32.

In the first embodiment, the oxygen concentration sensor (A/F sensor) for linearly detecting an oxygen concentration in the exhaust gas is used as a gas sensor, but as an alternative, an O2 sensor for outputting an electromotive force different depending on richness or leanness of an air-fuel ratio in the exhaust gas may be used. In addition, the sensor may use a sensor with a cup-shaped structure in place of a laminated structure.

Besides, the present invention may be applied to any gas sensor as long as the gas sensor includes a sensor element formed of solid electrolyte and performs a normal output in a predetermined active state (active temperature). For example, the present invention may be applied to a NOx sensor for calculating density (NOx density) of nitrogen oxides in the exhaust gas or a HC sensor for calculating density (HC density) of hydrocarbons in the exhaust gas.

While only the selected example embodiments have been chosen to illustrate the present invention, it will be apparent to those skilled in the art from this disclosure that various changes and modifications can be made therein without departing from the scope of the invention as defined in the appended claims. Furthermore, the foregoing description of the example embodiments according to the present invention is provided for illustration only, and not for the purpose of limiting the invention as defined by the appended claims and their equivalents.

What is claimed is:

1. A heater control device for a gas sensor which includes a sensor element for detecting density of a specific component in a gas and a heater for heating the sensor element and is located downstream of an exhaust gas purifying device in an exhaust pipe for an in-vehicle engine to control power supply to the heater in such a manner as to make the sensor element at a predetermined active state, comprising:

heat calculating means which calculates heat data corresponding to a heat budget in the exhaust pipe at a vicinity of the gas sensor after engine startup based upon an operating condition of an engine and a driving condition of a vehicle;

determination means which makes a determination as to dryness inside the exhaust pipe based upon the calculated heat data, the determination means comprising:

wall temperature calculating means which calculates an exhaust pipe wall temperature at a vicinity of the gas sensor based upon the heat data;

dew point temperature calculating means which calculates a dew point temperature at a vicinity of the gas sensor based upon a state inside the exhaust pipe; and dry state determination means which compares the exhaust pipe wall temperature with the dew point temperature to determine a dry state inside the exhaust pipe;

limit means which limits the power supply to the heater based upon the result of the determination as to the dryness by the determination means; and estimating means which estimates oxygen concentration inside the exhaust pipe based upon the operating condition of the engine, wherein: the dew point temperature is calculated based upon the estimated oxygen concentration.

2. A heater control device for a gas sensor according to claim 1, wherein: the heat calculating means comprising: means which calculates an exhaust-pipe-receiving heat at a vicinity of the gas sensor based upon an exhaust gas temperature and an exhaust gas speed at a vicinity of the gas sensor; means which calculates an exhaust-pipe-releasing heat at a vicinity of the gas sensor based upon an outside air temperature and a vehicle running speed; and means which calculates the heat data from a differential quantity between the exhaust-pipe-receiving heat and the exhaust-pipe-releasing heat.

3. A heater control device for a gas sensor according to claim 1, wherein: the in-vehicle engine includes a diesel engine.

4. A heater control device for a gas sensor which includes a sensor element for detecting density of a specific component in a gas and a heater for heating the sensor element and is located downstream of an exhaust gas purifying device in an exhaust pipe for an in-vehicle engine to control power supply to the heater in such a manner as to make the sensor element at a predetermined active state, comprising:

limit means which limits the power supply to the heater based upon (i) heat data corresponding to a heat budget in the exhaust pipe at a vicinity of the gas sensor after engine startup, which is calculated based upon an operating condition of an engine and a driving condition of a vehicle, and (ii) a determination as to a dryness inside the exhaust pipe based upon the calculated heat data, the determination including a comparison of an exhaust pipe wall temperature at a vicinity of the gas sensor with a dew point temperature at a vicinity of the gas sensor, the dew point temperature below calculated using an estimated oxygen concentration inside the exhaust pipe based upon the operating condition of the engine.

5. A heater control device for a gas sensor which is located in an exhaust pipe of an engine and includes a sensor element for detecting density of a specific component in a gas and a heater for heating and activating the sensor element, comprising:

an adjuster which adjusts a power supply to the heater based upon (i) heat data corresponding to a heat budget in the exhaust pipe at a vicinity of the gas sensor after engine startup, which is calculated based upon an operating condition of an engine and a driving condition of a vehicle, and (ii) a determination as to a dryness inside the exhaust pipe based upon the calculated heat data, the determination including a comparison of an exhaust pipe wall temperature at a vicinity of the gas sensor with a dew point temperature at a vicinity of the gas sensor, the dew point temperature being calculated using an estimated oxygen concentration inside the exhaust pipe based upon the operating condition of the engine.

6. A method of controlling heating for a gas sensor which includes a sensor element for detecting density of a specific component in a gas and a heater for heating the sensor element and is located downstream of an exhaust gas purifying device in an exhaust pipe for an in-vehicle engine to control power supply to the heater in such a manner as to make the sensor element at a predetermined active state, the method comprising:

calculating heat data corresponding to a heat budget in the exhaust pipe at a vicinity of the gas sensor after engine startup based upon an operating condition of an engine and a driving condition of a vehicle;

determining a dryness inside the exhaust pipe based upon the calculated heat data, the determining of the dryness comprising:

calculating an exhaust pipe wall temperature at a vicinity of the gas sensor based upon the heat data;

calculating a dew point temperature at a vicinity of the gas sensor based upon a state inside the exhaust pipe; and comparing the exhaust pipe wall temperature with the dew point temperature to determine a dry state inside the exhaust pipe;

limiting the power supply to the heater based upon the result of the determination of the dryness; and estimating an oxygen concentration inside the exhaust pipe based upon the operating condition of the engine, the dew point temperature being calculated based upon the estimated oxygen concentration.

7. A method according to claim 6, wherein said calculating heat data comprises:

calculating an exhaust-pipe-receiving heat at a vicinity of the gas sensor based upon an exhaust gas temperature and an exhaust gas speed at a vicinity of the gas sensor;

calculating an exhaust-pipe-releasing heat at a vicinity of the gas sensor based upon an outside air temperature and a vehicle running speed; and calculating the heat data from a differential quantity between the exhaust-pipe-receiving heat and the exhaust-pipe-releasing heat.

8. a method according to claim 6, wherein the in-vehicle engine includes a diesel engine.

* * * * *